United States Patent [19]
Oelbrandt et al.

[11] Patent Number: 5,965,331
[45] Date of Patent: Oct. 12, 1999

[54] PHOTOTHERMOGRAPHIC PROCESSING SYSTEM

[75] Inventors: Leo Oelbrandt, Kruibeke; Karl Anthonissen, Rumst; Marc De Niel, Borgerhout; Martin De Kegelaer, Waasmunster, all of Belgium

[73] Assignee: AGFA-Gevaert, N.V., Mortsel, Belgium

[21] Appl. No.: 08/883,503

[22] Filed: Jun. 26, 1997

[30] Foreign Application Priority Data

Jun. 26, 1996 [DE] Germany ................... BE 09600583

[51] Int. Cl.⁶ .................. G03C 5/16; G03C 1/498

[52] U.S. Cl. .................. 430/350; 430/617; 430/619

[58] Field of Search ..................... 430/350, 349, 430/352, 330, 619, 617

[56] References Cited

U.S. PATENT DOCUMENTS 4,031,740  6/1977  Achermann .
4,193,078  3/1980  Esposito ........................... 346/76

*Primary Examiner*—Thorl Chea
*Attorney, Agent, or Firm*—Breiner & Breiner

[57] ABSTRACT

An apparatus and a method for bringing a thermographic imaging element (11) to a desired temperature by means of thermal contact with a heating body (10, 30) which is at least filled with an accessory material in a first phase (15) and with said accessory material in a second phase (16) comprise pressure setting means (17, 18) for setting a desired pressure, energy means (19) for exchanging thermal energy with said heating body, detection means for detecting a phase or a phase transition of said accessory material, and relocation means for bringing said imaging element into contact with said heating body.

7 Claims, 3 Drawing Sheets

FIG. 3.1

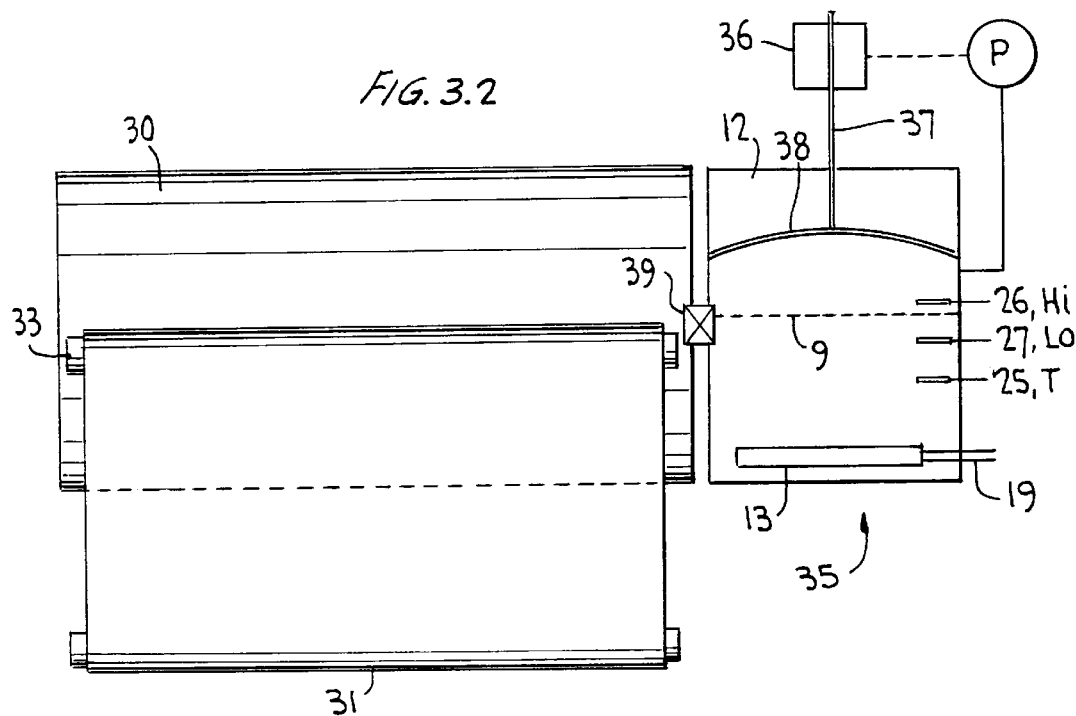
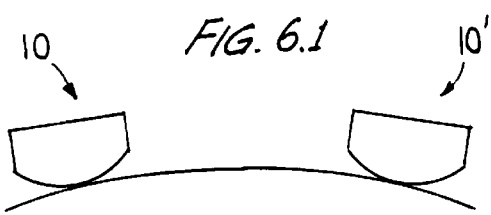
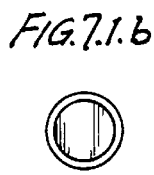
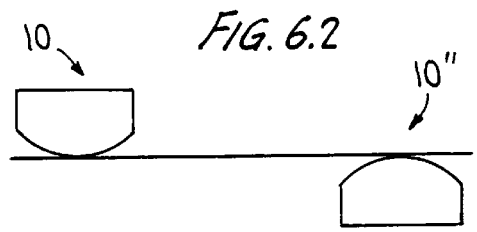
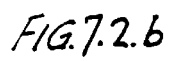
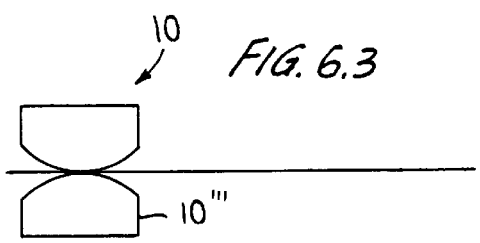

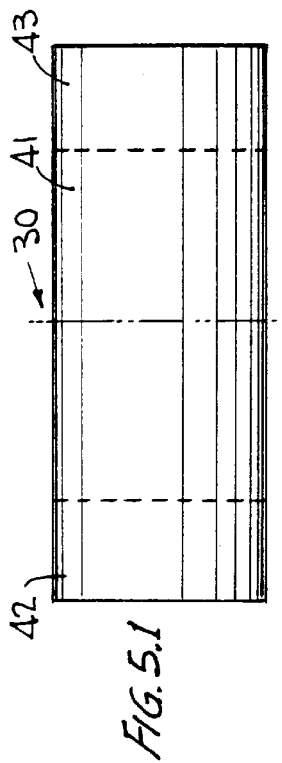
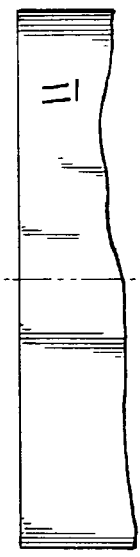
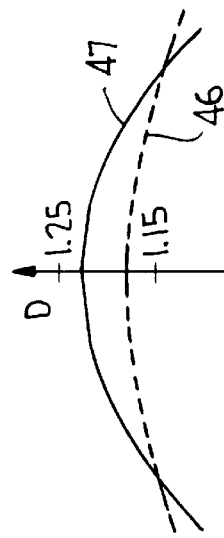
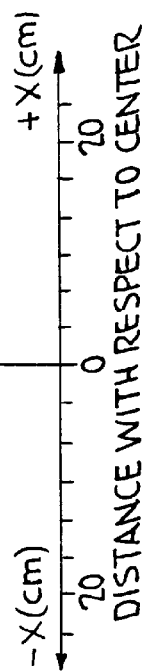
FIG.5.1    FIG.5.2    FIG.5.3
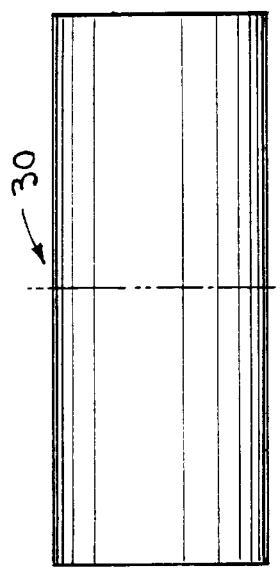
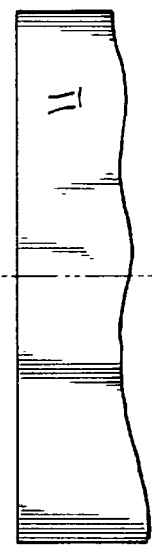
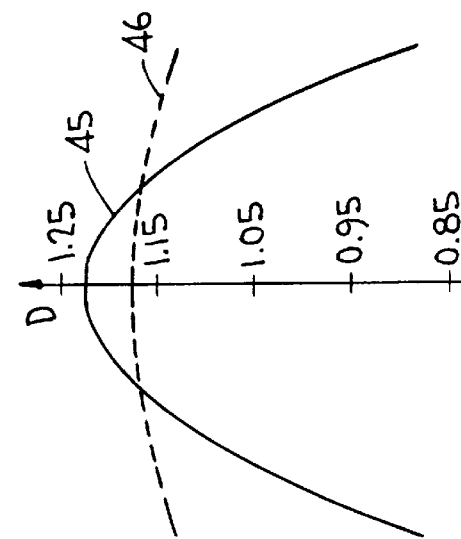
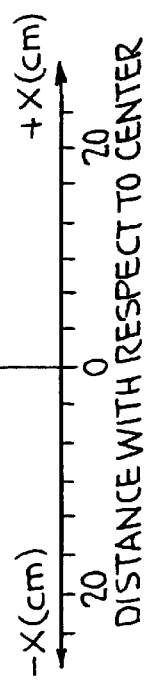
FIG.4.1    FIG.4.2    FIG.4.3

PHOTOTHERMOGRAPHIC PROCESSING SYSTEM

1. FIELD OF THE INVENTION

The present invention relates to an apparatus and a method for processing a thermographic material, in particular a photothermographic material, also referred to as "imaging element".

2. PRIOR ART

Thermally processable silver-containing materials for producing images by means of exposing followed by heating are referred to as thermographic materials and are generally known. For example: "Dry Silver®" materials from Minnesota Mining and Manufacturing Company. A typical composition of such thermographically imaging elements includes photosensitive silver halide in combination with an oxidation-reduction combination of, for example, an organic silver salt and a reducing agent therefor. These combinations are described, for example, in U.S. Pat. No. 3,457,075 (Morgan) and in "Handbook of Imaging Science", D. A. Morgan, ed. A. R. Diamond, publ. by Marcel Dekker, 1991, page 43.

An overview of thermographic systems is given in the book "Imaging Systems" by Kurt I. Jacobson and Ralph E. Jacobson, The Focal Press, London and New York, 1976, in chapter V under the title "Systems based on unconventional processing" and in chapter VII under the title "7.2 Photothermography".

Photothermographic imaging elements are typically processed by imagewise exposure, for example in contact with an original or after electronic image processing with the aid of a laser, as a result of which a latent image is formed on the silver halide. Further information on such imagewise exposures can be found in Patent Application EP-A-96.201.530.1 of Agfa-Gevaert.

In a subsequent heating step the latent image formed exerts a catalytic effect on the oxidation-reduction reaction between the reducing agent and the non-photosensitive organic silver salt, usually silver behenate, as a result of which a visible density is formed at the exposed locations. The processing conditions are defined by the choice of the non-photosensitive organic silver salt and a reducing agent therefor. For example, the processing temperature is around 120° C., for five seconds.

Further information on the said thermographic materials can be found, for example, in said Patent Application EP-A-96.201.530.1.

Practical problems with the processing of photothermographic imaging elements often result from the fact that the density formed depends on the amount of heat supplied. Obtaining a uniform density therefore requires a uniform heat transfer.

Medical applications, moreover, require a large number of grey values, which have to be represented in a reproducible manner.

The technical literature contains previous descriptions of various apparatuses for processing these materials.

U.S. Pat. No. 4,198,145 (Scott) makes use of forced convection with the aid of warm air; however, this does give rise to problems in terms of uniformity, inter alia because of evasion patterns of the air. WO. 93/020480 (Svendsen) describes a convection straight-through oven; but this is less suitable for short processing times.

Other patents report apparatuses which work with microwave processing such as U.S. Pat. No. 4,120,722 (Okamoto) or with electrically conductive back layers such as e.g. U.S. Pat. No. 4,193,078 (Esposito). Both systems are less readily applicable for uniform heat transfer, because of problems with uniformity of the sources and with possible differences in absorption in the material. U.S. Pat. No. 3,648,019 (Brewitz) and U.S. Pat. No. 4,275,959 (Jones) make use of heat conduction by pressing the material against a warm body.

These solutions likewise do not provide adequate temperature uniformity over all of the material. The aim is uniformity within an order of magnitude of 0.1° C., depending on the gradation of the material.

3. OBJECT OF THE INVENTION

It is an object of the present invention to provide an apparatus or system and a method or process for the uniform processing of a photothermographic material consisting in the fact that during the processing equal temperatures obtain at all locations of said photothermographic material.

Another object of the present invention is to provide a method and an apparatus for processing a photothermographic material at a temperature which is constant over time.

Further objectives and advantages will become clear from the description following hereinafter.

4. SUMMARY OF THE INVENTION

We have now found that these objects can be achieved by effecting the temperature control of the apparatus with the aid of adjusting a phase transition of a material.

A first aspect of this invention provides an apparatus for bringing an imaging element to a desired temperature by means of thermal contact with a body, at least filled with an accessory material in a first phase and with said accessory material in a second phase—hereinafter referred to as "heating body"—comprising:

means for setting a desired pressure, hereinafter referred to as pressure setting means;
means for exchanging thermal energy with said heating body, hereinafter referred to as energy means;
means for detecting a phase or a phase transition of said accessory material, hereinafter referred to as detection means;
means for bringing said imaging element into contact with said heating body, hereinafter referred to as relocation means.

A second aspect of the present invention provides a method for bringing an imaging element to a desired temperature by means of contact with a body, filled at least with an accessory material in a first phase and with said accessory material in a second phase—hereinafter referred to as "heating body"—, comprising the following steps:

setting a desired pressure;
supplying thermal energy to said heating body or removing it therefrom;
detecting a phase or a phase transition of said accessory material;
bringing said imaging element into thermally conductive contact with said heating body.

5. BRIEF DESCRIPTION OF THE FIGURES

FIG. 3.1 shows a cross-section of a drum-type design of an apparatus according to the present invention:

FIG. 3.2 shows a longitudinal section through a drum-type design of an apparatus according to the present invention:

FIG. 4.1. shows a schematic representation of a heating body in the form of a conventional drum;

FIG. 4.2. shows a schematic representation of a photothermographic material which can be used in the present invention;

FIG. 4.3. shows the density profile measured on a photothermographic material processed around a drum according to a known technique against that developed according to the present invention;

FIG. 5.1. shows a schematic representation of a heating body in the form of a special drum;

FIG. 5.2. shows a schematic representation of a photothermographic material which can be used in the present invention;

FIG. 5.3. shows the density profile measured on a photothermographic material developed around a special drum according to a known technique against that developed around a drum according to the present invention;

FIG. 6.1 shows two plungers positioned on one side and in series along the path followed by the imaging element;

FIG. 6.2 shows an iteratively alternating setup;

FIG. 6.3 shows a bilateral setup of two plungers;

FIGS. 7.1.*a* and 7.2.*a* show two drums having non-cylindrical profiles.

FIGS. 7.1.*b* and 7.2.*b* show end views of FIGS. 7.1.*a* and 7.2.*a*, respectively.

6. DETAILED DESCRIPTION OF THE INVENTION

6.1. Phase transition diagram

The term "phase" of a material or component refers to any homogeneous and physically distinguishable part of a physical system which is separated from other parts of the physical system by definable bounded surfaces.

It is generally known that the temperature remains very stable if a pure substance changes phase. The best-known examples of this are melting and boiling of water. During this processes the temperature of the two phases—in this case melting ice and boiling water—remains constant as long as heat is supplied or removed and both phases are present. It is also generally known that the temperature at which this phase transition takes place depends on the pressure. The phase transition temperature can therefore be influenced by adjusting the pressure. Thus, for example, the boiling point of water rises from 100° C. to 130° C. if the pressure is raised from 1 atmosphere to 2.7 atmospheres. This phenomenon applies to all unitary systems, i.e. systems in which only one pure component is present. This applies both to the melting/solidification equilibrium (cf. water and ice) and to evaporation-condensation (cf. water and water vapour) and subliming—subliming (cf. volatilization to give water vapour or frosting to produce ice; also known with e.g. camphor and naphthalene), as will be illustrated below.

Figure 1:
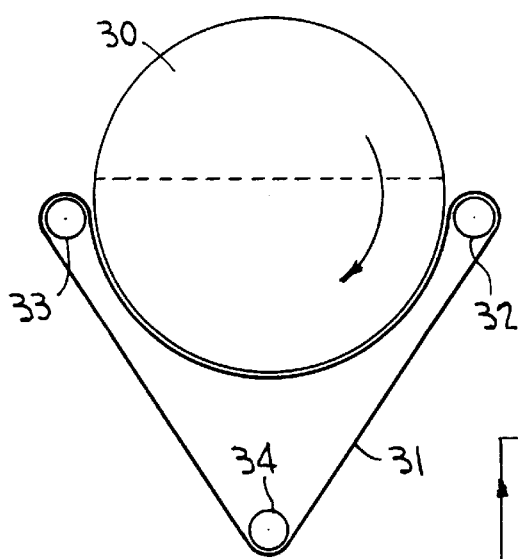
FIG. 1 depicts a phase diagram for a one-component system.
Figure 1:
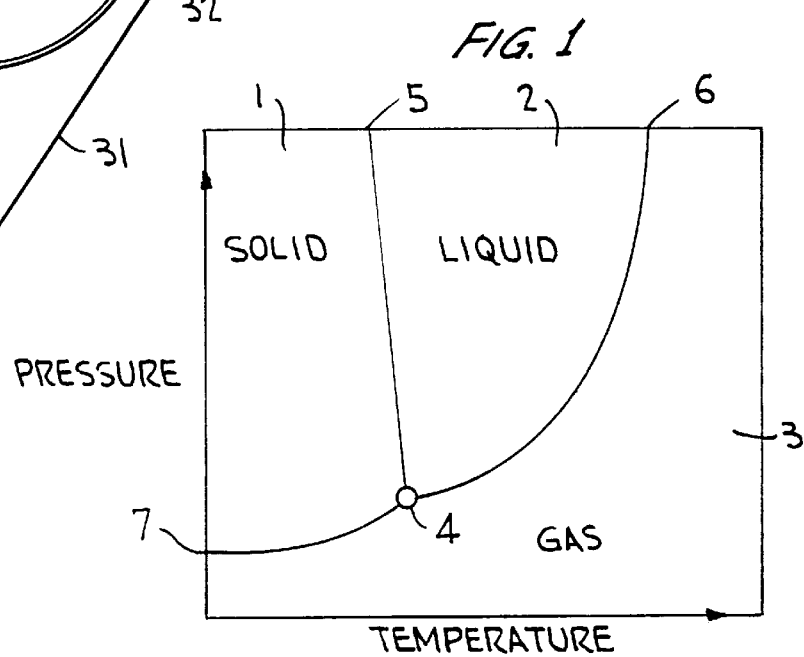

The phase diagram or phase equilibrium diagram illustrates the equilibrium conditions between the various manifestations or phases of a material; in other words the existence limits of the various phases as a function of temperature and pressure. An example of such a diagram is shown in FIG. 1, where the line between 4 and 6 represents the variation of the vapour pressure of the liquid as a function of the temperature and thus describes the transition between the liquid phase 2 and the gas phase 3, which is also referred to as evaporation-condensation of the substance. The line between 4 and 7 does the same for the variation in vapour pressure for the transition between the solid phase 1 and the gas phase 3, also referred to as sublimation-frosting. The transition between solid phase 1 and liquid phase 2, the melting/solidification of the substance, is indicated by the line between 4 and 5.

It can be postulated that the two phases—vapour and liquid, solid and liquid, solid and gas, respectively—are in equilibrium at temperatures and pressures represented by each of the lines of the diagram. At the triple point 4, where the three curves converge, the three phases are even in equilibrium simultaneously. This is the only point where this can happen. In the areas 1, 2 and 3 between the curves, only one phase can be present.

J. Willard Gibbs (1876) established the phase rule. According to a simple generalization this phase rule describes the conditions which must be met for equilibrium between the phases. The application of this rule to physical chemistry is to be credited to H. W. B. Roozeboom (1884). If the system is affected solely by pressure, temperature and concentration it can be stated that at equilibrium $$F=C-P+2 \qquad [1]$$

where F is the number of degrees of freedom, C is the number of components and P is the number of phases.

For a single-component or unitary system such as the one discussed here, C is equal to 1, so that equation [1] is reduced to $$F=3-P \qquad [2]$$

If only one phase is present in this system (zones 1, 2 and 3 in FIG. 1), both temperature and pressure of the phase are required for a complete definition of the system. Temperature or pressure on their own are not sufficient to define the condition of the system, since two parameters are necessary, after all, to establish each specific point in a particular zone. This is referred to as a bivariant system because of the two degrees of freedom.

If, however, two phases are present simultaneously in the system, which means that the system is somewhere on the line 4–7, 4–5 or 4–6, it is sufficient to specify only one of the two variables—pressure or temperature. The other variable is then automatically defined as well. The system is called univariant, because there is only one degree of freedom. It is this univariant system which forms the basis of the present invention.

A form which has been carried even further makes use of the so-called "triple point", where the three phases are present simultaneously; this is illustrated by point 4 in FIG. 1. This system has no degree of freedom, and the simultaneous presence of the three phases defines both the temperature and the pressure. This system is referred to as invariant. The triple point of water is used, for example, for calibrating extremely accurate instruments for measuring temperatures, but is not easy to establish.

The applications described herein will therefore in most cases make use of two-phase systems, more specifically of liquid-gas transitions, which does not mean that other systems would be unsuitable.

A non-limiting list of suitable substances, with their boiling point at various pressures, can be found in the "Handbook of Chemistry and Physics, 67th edition 1986–1987, CRC press, inc.", from p. D-192 to p. D-212 inclusive.

A few examples of boiling ranges (transition liquid-gaseous phase; cf. so-called vapour pressure line 4–6 in FIG. 1) for information:

| | | |
|---|---|---|
| ethyl propionate | from 100 to 125° C. | at from 1 to 2 bar |
| sec-butyl alcohol | from 100 to 147° C. | at from 1 to 5 bar |
| $CCl_4$ | from 100 to 140° C. | at from 2 to 5 bar |
| 2-propanol | from 101 to 130° C. | at from 2 to 5 bar |
| 1,2-dichloroethane | from 108 to 147° C. | at from 2 to 5 bar |
| $CCl_3F$ | from 108 to 150° C. | at from 10 to 20 bar |
| $SiCl_3F$ | from 95 to 130° C. | at from 10 to 20 bar |

A non-limiting list of suitable substances with their sublimation point at various pressures can be found in the "Handbook of Chemistry and Physics", 75th edition, 1994, by CRC Press Inc., in the chapter "Sublimation pressure of solids" on p. 6–65, or alternatively in the "VDI-Waermeatlas", 7th edition, 1994, in the chapters "Kalorische und kritische Daten" [calorific and critical data] and "Siede- und Sublimationstemperaturen bei verschiedenen Druecken" [Boiling and sublimation temperatures at various pressures], p. Dc1 to Dc10 inclusive.

A few examples of sublimation ranges (transition solid-gaseous phase; cf. so-called sublimation line 4–7 in FIG. 1):

| | | |
|---|---|---|
| $C_2Cl_6$ hexachloroethane | from 29.8 to 184.2° C. | at from 1 to 1000 mbar |
| $CBr_4$ tetrabromomethane | from 24.9 to 80.3° C. | at from 1 to 25 mbar |
| $I_2$ iodine | from 34.8 to 110.3° C. | at from 1 to 100 mbar |
| $C_{10}H_8$ naphthalene | from 49.0 to 70.1° C. | at from 1 to 5 mbar |

The phase transition temperatures quoted here are primarily directed at processing photothermographic materials and are, as a matter of principle, above room temperature.

For possible use of a method according to the present invention in another field, lower temperatures may alternatively be opportune in some cases. Again the reference books quoted can be consulted. To give just one example for illustrative purposes:

$CO_2$ carbon dioxide sublimes at temperatures of from −153.9° C. at 1 mbar to −56.7° C. at 5 bar.

A nonlimiting list of suitable substances with their freezing point at various pressures can be shown in the "Handbook of Chemistry and Physics", 75th edition, 1994, by CRC Press Inc., in the chapter "Influence of pressure on freezing points" on p. 6–53.

A few examples for melting ranges (transition solid-liquid phase; cf. so-called melting line 4–5 in FIG. 5):

water freezes at 0° C. if 1 bar (=0.1 MPa); at −9.0° C. if 100 MPa;

$C_{10}H_{20}O$, menthol, freezes at 42° C. if 0.1 MPa; at 60° C. if 100 MPa;

$C_{10}H_8$, naphthalene, freezes at 78.2° C. if 0.1 MPa; at 115.7 if 100 MPa; etc.

Major advantages of the use of a phase transition according to the present invention result from the fact that during a phase transition no changes in temperature will occur. In other words, as long as both phases are present, heat can be supplied to the system or removed therefrom without a change in temperature taking place. As a result, the processing of photothermographic materials takes place at a temperature which is uniform over all the locations and at the same time at a temperature which remains constant over time. It should be noted that these sharp temperature limits correspond to an intrinsic feed forward of the physical system itself, without extrinsic feedback from outside; in principle, no additional regulation mechanisms are required.

In a preferred embodiment of an apparatus according to the present invention, pressure and temperature characteristics (P-T) relating to at least one phase transition of at least one substance are stored beforehand in an electronic memory. For example: the numerical values of the transition boiling versus condensing of water and water vapour (also compare FIG. 1, curve 4–6, being the so-called vapour pressure line).

The electronic memorization of such vapour pressure characteristics can take place on the basis of a mathematical equation (with a rather analogue-continuous course) or on the basis of discrete-discontinuous values (e.g. in so-called look-up tables or LUTs). In the case of pure water and pure ice, an elaborated illustration of the two systems can be found in "Smithsonian meteorological tables", Smithsonian institution press, Washington, sixth edition, 1984, tables 94 & 96 headed, respectively, "Saturation vapor pressure over Water" and "Saturation pressure over ice."

To increase the reliability of the system, detection means can be fitted which effectively monitor when a particular phase transition is taking place. It is thus possible to determine, inter alia, the effect of possible contamination on the phase transition.

For the phase transition quoted such detections can be based on: monitoring the liquid level—since the liquid level drops during boiling; with the aid of mechanical or electrical means—, optoelectronic detection of the turbidity of the liquid, ultrasonic detection—cf. Doppler effect—of rising air bubbles or simply observing the temperature range covered, the latter being carried out, for example, by the temperature being recorded every 0.2 s; as long as the temperature remains constant (at constant pressure) the system is boiling or condensing . . .

It is known from experiments and the literature that the heat transfer coefficient α of boiling or condensing liquids increases strongly with respect to the value in the case of free or forced convection, which is an additional advantage of the present invention. For example, this coefficient α in the case of free convection, for a series of various gases, is 5–25 $W/m^2K$ and for water 100–850 $W/m^2K$; in the case of forced convection, for gas=10–300 $W/m^2K$ and for water= 250–11,000 $W/m^2K$; in the case of phase transition, for boiling=2500–60,000 $W/m^2K$ and for condensation= 5000–100,000 $W/m^2K$.

The following chapter demonstrates that the concepts of heat transfer by conduction can operate much more rapidly than certain other forms of heat transfer. To this end we calculate the thermal time constants which apply during the heating of a polyethylene terephthalate, PET, base, for example with an area S=1 $m^2$ and a thickness d=175 $\mu$m. A few constants for PET: specific mass $\rho$=1400 $kg/m^3$, and specific heat c=1460 J/kg.K.

Initially the heat content is $$Q = d \cdot S \cdot \rho \cdot c \qquad [3]$$

$$Q = 175 \cdot 10^{-6} \times 1 \times 1400 \times 1460 = 358 \; J/m^2.K$$

We then calculate the thermal time constants with which various heat transfer systems—preferably within a heating period of 5 seconds, so that sufficiently rapidly visible images become available to the operator of the apparatus— bring the specimen described from an initial temperature of 20° C. to a final temperature of 80° C. According to thermodynamics such a time constant, expressed in seconds, can be calculated from the relationship $$\tau = Q/\alpha \qquad [4]$$

Heat transfer for the free convection of air, where α=≈5 $W/m^2$.K, gives τ=358/5=72 s. This does make it rather clear that the postulated period of 5 s is definitely not achieved. Bringing down the heating-up time required calls for very high air temperatures, possibly even bringing radiation into play.

Heat transfer with forced convection of air and water vapour, where $\alpha \approx 80$ W/m$^2$.K gives $\tau=358/80=4.5$ s. Since no equilibrium is reached within a postulated period of 5 s, a higher air temperature will obviously be required.

Heat transfer by conduction where $\alpha>1500$ W/m$^2$.K gives a $\tau=358/1500=0.24$ s. Under the assumption that in actual fact aluminium (with a conductivity coefficient of about 200 W/m.K) having a thickness of 10 mm is used, $\alpha=(200:0.01=)20,000$ W/m$^2$.K and the time constant $\tau$ becomes even more significantly favourable. A thermal equilibrium, generously assumed at, for example five time constants then amply meets the postulated processing time of 5 seconds. Thence we deduce that concepts of heat transfer by conduction can work very much more rapidly than certain other forms of heat transfer.

6.2. First embodiment: plunger concept

Figure 2:
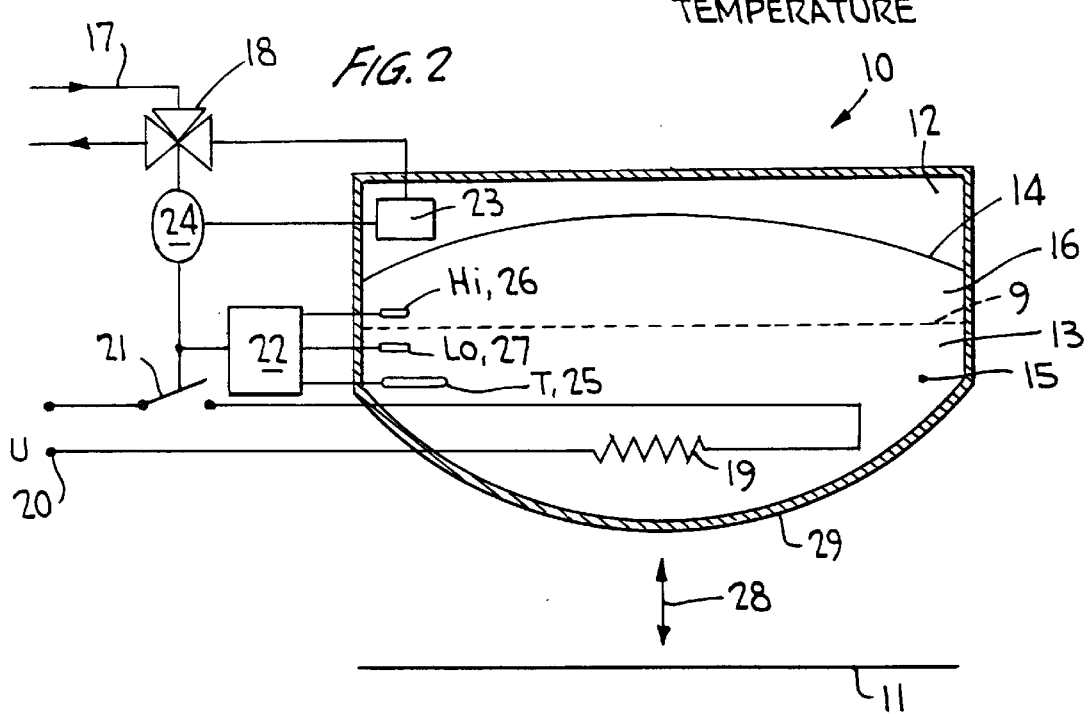
FIG. 2 shows a plunger-type design of an apparatus according to the present invention.

FIG. 2 describes a prototype of an apparatus based on the "plunger" principle. This principle makes use of a heated plunger 10 against which the photothermo-graphic material to be processed is pressed during the processing or which is itself pressed against the material 11 with the aid of a press-on means 28; not drawn here in detail. The photothermographic material to be developed may be moved underneath the plunger either on reels or as loose sheets. At least one contact zone 29 of plunger 10 is made from a material which has good thermal conductivity and also withstands the operating pressures of the system. Preferably, a metal such as copper or aluminium is used for this purpose. In a further preferred embodiment of the present invention said conductive contact area also receives an aftertreatment to limit friction and so-called "stick-slip" between contact area and thermographic material: e.g. hard anodization (in the case of aluminium,) hard chromium plating, application of a thin film of poly(tetrafluoro-ethylene) PTFE (as known under the brand name Teflon).

The plunger 10 is split into two compartments 12 and 13, separated by a diaphragm 14. Via the diaphragm a change in volume in the bottom compartment can be achieved, which automatically results in a change in pressure in the system (according to the generally known gas law). The bottom compartment 13 in that case contains the two phases 15 and 16, for example a liquid phase 15 and a vapour phase 16. By means of, for example, compressed air 17 the diaphragm 14 can be pressurized, for example via a three-way valve 18. Optionally the diaphragm can also be driven mechanically with the aid of, for example, a motor drive (as shown in FIG. 3). Three-way valve 18 can also be used to release excess pressure.

If use is not made of a diaphragm 14 it is possible, in another embodiment of the present invention, for example with the aid of a compressor and a buffer tank—not drawn here—to compress or expand the vapour phase. In this case the physical parameter "pressure P" is acted upon directly, where in previous embodiments (cf. FIG. 2 and 3) the parameter pressure tended to be adjusted via an intervention in the physical parameter "volume V" (related to one another via the generally known gas law P.V=kte.T).

The liquid phase can be heated with the aid of an electric heating element 19—supplied with voltage via the lead 20—, but also heating techniques are likewise possible. This element 19 can be controlled, for example, by means of a switch 21 which is switched from a central control unit 22. This control unit 22 also regulates the pressure of the system which is measured via a pressure sensor 23, by activating the three-way valve 18 via a transducer 24. The same control unit also measures the temperature of the system by a temperature sensor 25 and checks the liquid level 9 by means of the sensors Hi with ref. no. 26 and Lo with ref. No. 27. These measured data are used to readjust pressure and heating. If the pressure P is changed, a rather more rapid response is obtained in terms of regulating the temperature. If the temperature T is changed, a rather more sluggish response is obtained in terms of regulating the pressure.

6.3. Second embodiment: drum concept

FIG. 3 describes a similar apparatus, but is now based on a drum concept. FIG. 3.1 depicts a cross-section of the apparatus, and FIG. 3.2 a longitudinal section. Both figures will be discussed together during the following. In this concept the plunger 10 from FIG. 2 was replaced by a rotating cylinder 30. Heating of the cylinder 30 can be effected in a similar manner as that described in the concept of FIG. 2. A beneficial consequence of the rotation of the cylinder 30 is that a temperature distribution in the liquid becomes particularly homogeneous, although this is countered by the unfavourable consequence that implementation of the heating system becomes more difficult from a constructional point of view. A stationary filling chamber 35 was therefore opted for, which is coupled to the cylinder 30 via a hollow bearing 39. Via said bearing 39 the two phases can fill the two sections without hinderance. To keep the system effectively sealed (which incidentally means an additional advantage in terms of ease of operation, safety and the like), suitable seals (e.g. made of durable plastics or of ceramic materials) have to prevent undesirable leaks or contamination from occurring.

In said filling chamber 35 a diaphragm 38 is positioned which, via a shaft 37 with the aid of the motor drive 36, is able to alter the volume in the filling chamber. Measuring and controlling the two phases can be effected in a manner similar to that described in FIG. 2.

In this concept the film is transported by means of a corotating conveyor belt 31 which presses the film against the warm cylinder 30. obviously, other press-on methods are also conceivable. If reel film is involved, the conveyor belt may even be omitted and it is possible for the film tension, for example, to ensure good press-on contact. In the concept of FIG. 3 the belt 31 is pressed against the heated cylinder 30 by two rollers 32 and 33. By the positioning of these rollers 32 and 33 and their diameter, the angle of wrap of the belt can be adjusted from a few degrees to almost 360 degrees. The roller 34 ensures that the belt 31 is tensioned against the cylinder 30. This can be effected both by the weight of the roller 34 itself (cf. gravity) and, for example, by a force applied via the bearing arrangement of said roller 34, the latter having the advantage that the apparatus can be set up at an angle or even vertically without the tension of the belt 31 being affected.

By regulating the speed and the pressure of the belt 31 it is also possible to minimize any negative effect of material on uniform heat transfer. Another advantage of this concept is the fact that film transport need not be stopped during processing, which makes control of the transport simpler than that of FIG. 2.

With respect to FIGS. 2 and 3, use has been made so far of a diaphragm (cf. 14 and 38) to effect a change in volume and thus a change in pressure. Such a diaphragm was situated either in a plunger-type heating body 10 or in the filling chamber of a drum-type heating body 30. In another embodiment according to the present invention fine pressure regulation can be achieved by the volume of said heating body being altered by the introduction of an additional object. Thus the—possibly gradual—introduction of a cylinder may provide an additional check on the operating pressure applied.

As can be seen from the description of FIGS. 2 and 3, the present application provides an apparatus for bringing an imaging element 11 to a desired temperature by means of thermal contact with a body (10, 30), at least filled with an accessory material in a first phase 15 and the said accessory material in a second phase 16—hereinafter referred as "heating body".

Said apparatus comprises means for setting a desired pressure, hereinafter referred to as pressure setting means 17, 18; means for exchanging thermal energy with said heating body, hereinafter referred to as energy means 19; means for detecting a phase or a phase transition of said accessory material, hereinafter referred to as detection means; means for bringing said imaging element into contact with said heating body, hereinafter referred to as relocation means.

A more sophisticated apparatus also comprises a unit for regulating temperature, pressure and quantity of said accessory material, hereinafter referred to as regulating unit 22.

The above can also be expressed as a description of an apparatus for processing a photothermographic material at a stable temperature, said temperature being distributed uniformly over the entire heated surface.

In the process, the heat is supplied by a material which, with the aid of a heating element, warms up as far as its phase transition; the temperature at which this phase transition takes place is defined by a set pressure; the temperature, pressure and quantities are monitored and readjusted by a regulating unit; and heat is transferred conductively to the photothermographic material to be processed.

A further embodiment of the present invention comprises a closed space, filled with a material which is heated electrically to its boiling or melting point, said boiling or melting point being set by means of a pressure control system.

In particular, said first phase, in a system in question, is a liquid phase. Analogously, said second phase is preferably a gaseous phase.

In another embodiment of such an apparatus the heated surface is a movable plunger which is pressed against the photothermographic material to be developed; or possibly the converse situation, i.e. the film being pressed against the plunger.

In an apparatus described in more detail, at least one contact zone 29 between said heating body and said imaging element is heat-conducting.

In a further preferred embodiment of an apparatus as described the heated surface is a rotating or indexing body of revolution.

In another embodiment of the present invention, the said heating body comprises a drum 30 of cylindrical, barrel-type convex or barrel-type concave or composite shape (see subsequent FIGS. 7.1.*a*, 7.1.*b*, 7.2.*a* and 7.2.*b* and means for rotating or indexing said drum, hereinafter referred to as rotation means 36.

In a further preferred embodiment the film is transported against the rotating cylinder with the aid of a corotating belt.

Naturally, said imaging element may be in the form of a sheet or a web.

In a further embodiment, said relocation means comprise both press-on means 28 to bring said imaging element into contact with said heating body, and synchronization means 21 for moving said imaging element synchronously with said heating body.

According to another aspect, the present invention provides a method for bringing an imaging element to a desired temperature by means of contact with a body, at least filled with an accessory material in a first phase and with said accessory material in a second phase—hereinafter referred to as "heating body".

The said method comprises the following steps: setting a desired pressure; supplying thermal energy to said heating body or removing it therefrom; detecting a phase or a phase transition of said accessory material; bringing said imaging element into thermally conductive contact with said heating body.

In a method according to the present invention, said imaging element comprises a photothermographic material.

More specifically, said invention deals with a photothermographic processing unit and a method for bringing said processing unit to a desired and stable temperature and maintain it thereat, this temperature being uniformly distributed over the entire heated surface. The said method comprises the following steps:

heating said processing unit by a material which, with the aid of a heating element, is heated up to a phase transition;

defining a temperature at which said phase transition takes place by setting a pressure;

checking and readjusting temperature and pressure by means of a regulating unit; and transferring heat via conduction to the photothermographic material to be processed.

In another version the present application provides a method for processing a photothermographic material at a stable temperature which is uniformly transferred to said material, where: said heat is supplied by a material which, with the aid of a heating element, is heated as far as its phase transition;

the temperature at which said phase transition takes place is defined by a specific set pressure;

a regulating unit monitors and readjusts the temperature and pressure; and the heat is transferred via conduction to the photothermographic material to be processed.

In a further preferred embodiment, said regulating unit will monitor and readjust, in an autonomous and intelligent manner, all the parameters in the process, such as temperature and pressure.

It should be obvious that in a system or apparatus or in a method or process according to the present invention, said photothermographic materials include a silver halide or a mixture of silver halides, one or more organic salts and one or more reducing agents. After exposure and processing, visual densities greater than 1 are thus obtained.

In a further preferred embodiment, said organic silver salt is silver behenate and said reducing agent is a phenolic reducing agent.

Said photothermographic materials preferably contain one or more toning agents which, upon processing, result in a neutral grey density.

Additionally, said further thermographic materials preferably contain one or more stabilizers so as to retain the quality of the image formed.

6.4. Comparative trials

On the basis of photothermographic materials as described extensively in the previously cited EP-A-96.201.530.1 a number of comparative experiments were carried out.

For a detailed description of the materials reference is made to said application, particularly to the chapters with the following headers: "INVENTION EXAMPLES 5 and 6", "Support", "Antistatic backside outermost layer", "Silver halide emulsion", "Silver behenate/silver halide emulsion", "Coating and drying of silver behenate/silver halide emulsion layer", "Protective layer" "Imagewise exposure and thermal processing".

As in the chapter last referred to, such imaging element were exposed with an 849 nm single-mode diode laser from SPECTRA DIODE LABS, with a nominal output of 100 mW, spot size—corresponding to $1/e^2$—of 28 µm, scanning at a rate of 50 m/s to a pitch of 14 µm, by means of a step filter having optical densities of between 0 and 3.0 in density steps of 0.15. The experiments were carried out mainly around an optical density equal to 1 on the imaging element, since in that range the human eye is particularly sensitive to small variations in density. Thermal processing was carried out on a drum at 119° C.

Density measurements were carried out with a MAC-BETH™ TD904 densitometer with an ortho filter.

Trials with a conventional homogeneous drum configuration

FIG. 4.1 gives a schematic representation of a conventional drum (having a diameter of 200 mm and a length of 17") as employed in a first experiment, whereas FIG. 4.2 gives a schematic representation of a photothermographic material.

After thermal processing around a conventionally heated drum (by means of electric resistors), curve 45 of FIG. 4.3 represents the density profile measured on said photothermographic material. Curve 46 gives the measured density profile on another sheet of photothermographic material, but now around another drum and processed in accordance with in accordance with the present invention. It can be clearly deduced from the comparison of curves 45 and 46 that the novel method produces a much more uniform density profile—in line with a corresponding temperature profile. The fact that there is still a drop at the lateral edges of the imaging element is due to technical limitations of the current experimental apparatus; further improvements are in the offing.

Trials with a segmented drum configuration

FIG. 5.1 gives a schematic representation of a segmented drum (likewise with a diameter of 200 mm and a length of 17") as employed in a second experiment, while FIG. 5.2 gives a schematic representation of a photothermographic material. In this experiment drum 30 actually consists of three sections, namely a middle section 41, a left-hand section 42 and a right-hand section 43, said side sections 42 and 43 internally having a higher electrical rating than the middle section 41 and, moreover, the ends of said side sections 42 and 43 are thermally particularly well insulated; in order to limit heat losses via the flanges or the shaft ends.

After thermal processing around such a segmented drum, curve 47 of FIG. 5.3 gives the density profile measured on said photothermographic material. Curve 46 gives the measured density profile on another sheet of photothermographic material, but now developed around a drum according to the present invention. On the one hand it can be clearly deduced, from the comparison of curves 45 and 47, that—according to conventional heating techniques—the segmented drum provides a much more uniform density profile (resulting from a corresponding temperature profile) than the non-segmented drum.

On the other hand it can be inferred, from the comparison of curves 46 and 47, that the method for thermal processing according to the present invention is superior by comparison with a so-called segmented conventionally heated drum.

6.5. Applicability

Having informed themselves of the present patent application, those skilled in the art will quite possibly propose other embodiments and/or other applications which, however, will be entirely based on the principle of the present invention.

Thus a system may may also comprise more than one heating body—either plunger or drum or a combination of the two—, e.g. a linear iteration of the same basic concept. Thus FIG. 6.1 shows at least two plungers (ref. 10 and 10') or drums positioned on one side and in series, one after the other, along a path 50 followed by the imaging element. FIG. 6.2 shows an iterative-alternating setup, with two plungers (ref. 10 and 10") or drums opposite one another on either side of a path 50 followed by an imaging element (possibly having two sides to be processed or to be dried). FIG. 6.3 shows a bilateral set-up of two drums (ref. 10 and 10"). Such set-ups may be of interest, inter alia, in systems having a photosensitive layer on both sides of a base, or having a photosensitive layer on one side of a base and an auxiliary layer (for example an antihalo layer or an antistress layer) on the other side of said base.

By extension, applications involving profiled plungers or profiled drums can also be conceived. FIGS. 7.1.*a*, 7.1.*b*, 7.2.*a* and 7.2.*b* illustrate two examples of profiled drums (refs. 30' and 30").

The present invention describes a heating body in preferred embodiments of a static plunger (10) or a rotating or indexing drum (30). Other possible mechanisms for example comprise a rotating cone, a drum with a number of small rollers around it which ensure that the imaging element is pressed on and/or transported, a linearly reciprocating table, or a table with a crossway motion etc.

As a function of a number of possibly relevant factors—such as availability, technical reliability, specific phase diagram, cost price etc.—additional auxiliaries may be added if appropriate against corrosion, algal growth, foaming, scaling etc.

If desired, other phase transitions can also be used such as solidification versus melting (for water and ice this is usually at 0° C.) or evaporation versus sublimation.

An appropriate choice is influenced, inter alia, by the required temperatures and their location above or below an ambient temperature; cf. heating versus cooling.

It may be worth mentioning in this context that the exchange of energy with said heating body need not necessarily take place electrically (such as resistive heating or cooling by means of inverse Peltier effect). In larger installations such an energy exchange may also take place, for example, via heat exchangers (with the aid of warm water from a central heating system or from a heating boiler; cold water from a cooling circuit; etc.).

The present invention can be used for preparing both prints (on the basis of e.g. paper, used inter alia in the copying sector; or on the basis of aluminium, used inter alia in lithography) and transparencies (on the basis of e.g. monochrome or colour film, used inter alia in medical diagnoses).

The applications are found both in graphical applications (as a rule with high contrast) and in medical applications (as a rule reproducing a large number of continuous tones).

Applications in other fields are also conceivable, such as general photography (in the context of drying wet-processed photographic materials), electro(photo)graphy (in connection with thermal fixing of toners, ink jet and toner jet (see below), printed matter (cf. drying of one or more inks), etc.

In printing systems via "ink jet" or via "toner jet", an ink fluid or a reactive toner is usually first sprayed in an imagewise manner onto a receiving material, followed by uniform heating. More information on ink jet systems can be found in, inter alia, EP-A-94,202,54.8 and in EP-0,691,211 (both in the name of Agfa-Gevaert). More information on toner jet systems can be found in, inter alia, EP-0 706 094 A1 (in the name of Agfa-Gevaert). In these cases too, uniform heating of this type can be carried out if required in accordance with the present invention.

We claim:

1. A method for bringing an imaging element to a desired temperature wherein said element is placed in heat exchange relationship with a heat exchange material, said heat exchange material capable of existing in a first and a second phase, comprising the following steps:

(i) bringing said heat exchange material to a desired pressure;
   (ii) supplying thermal energy to said heat exchange material or removing thermal energy therefrom;
   (iii) detecting a phase or phase transition of said heat exchange material;
   (iv) bringing said imaging element into heat exchange relationship with said heat exchange material; and
   (v) maintaining said imaging element in said heat exchange relationship until said imaging element reaches said desired temperature.

2. The method of claim 1 wherein said imaging element comprises a photothermographic material.

3. The method according to claim 1 wherein said first phase is a liquid phase.

4. The method according to claim 3 wherein said second phase is a gaseous phase.

5. The method according to claim 1 wherein said first phase is a gaseous phase.

6. The method according to claim 5 wherein said second phase is a liquid phase.

7. The method according to claim 1 wherein said first phase is a solid phase.

* * * * *